US008650588B2

(12) United States Patent
Mauduit et al.

(10) Patent No.: US 8,650,588 B2
(45) Date of Patent: Feb. 11, 2014

(54) END-TO END PROOF OF DISPLAY

(75) Inventors: Daniel Mauduit, Nice (FR); Eric Jean Francois Menguy, Roquefort les pins (FR); Michel Y. Porta, Cagnes sur mer (FR); Vincent Tassy, Cagnes sur mer (FR)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 13/290,267

(22) Filed: Nov. 7, 2011

(65) Prior Publication Data
US 2013/0081077 A1 Mar. 28, 2013

(30) Foreign Application Priority Data

Sep. 28, 2011 (EP) .................................. 11290446

(51) Int. Cl.
*H04H 20/14* (2008.01)
*H04H 60/29* (2008.01)
*H04N 7/167* (2011.01)
*H04L 9/32* (2006.01)
*G06K 9/00* (2006.01)

(52) U.S. Cl.
USPC ................ 725/22; 725/31; 713/176; 382/100

(58) Field of Classification Search
None
See application file for complete search history.

(56) References Cited

U.S. PATENT DOCUMENTS

| | | | |
|---|---|---|---|
| 2003/0115591 A1* | 6/2003 | Weissmueller et al. | 725/22 |
| 2009/0012880 A1 | 1/2009 | Tortola | |
| 2009/0049097 A1 | 2/2009 | Nocifera et al. | |
| 2009/0144157 A1 | 6/2009 | Saracino et al. | |
| 2009/0212113 A1 | 8/2009 | Chiu et al. | |
| 2011/0035590 A1 | 2/2011 | Liu | |
| 2012/0308071 A1* | 12/2012 | Ramsdell et al. | 382/100 |
| 2013/0054972 A1* | 2/2013 | Thorwirth | 713/176 |

OTHER PUBLICATIONS

Xpresentor 3.0, The Smarter Digital Signage Solution, Copyright 2010, 2 pages.
Tier Digital Signage Digest, Search Results for 'tier', Proof of Display + Foot Traffic + Awareness (+ Sales Uplift) = Proof of Campaign Performance, http://blog.broadsign.com/digitalsignagedigest/index.php?s=tier, Copyright 2012, 7 pages.

(Continued)

*Primary Examiner* — Oschta Montoya
(74) *Attorney, Agent, or Firm* — Andrea Bauer; Hoffman Warnick LLC

(57) ABSTRACT

Aspects of the invention are directed to a method and system for end-to-end proof of display. A method for according to an embodiment includes: generating a unique identifier (UID) for a triplet including an item of digital content, an identity of a playlist that includes the item of digital content, and an identity of a player on which the item of digital content is to be rendered; generating a visual identifier based on the UID and a timecode; rendering the item of digital content on a display screen; overlaying the visual identifier on the rendered item of digital content on the display screen; capturing the visual identifier on the display screen; and extracting the UID and timecode from the captured visual identifier. A match test is performed using the extracted UID to populate a match list, which is reported to a content manager to provide end-to-end proof of display.

21 Claims, 7 Drawing Sheets

(56) References Cited

OTHER PUBLICATIONS

Urazbaev et al., AVNetwork, Proof-of-play—an Irrefutable Pillar of Accountability for Digital Signage (Digital Out-of-Home) Advertising, http://www.avnetwork.com/print-page/article/84742, Copyright 2012, 3 pages.

Online PR Media, Minicom Digital Signage to introduce a unique Proof of Performance technology for Digital Signage, http://www.onlineprnews.com/news/34298-1273066723-minicom-digital-signage-to-introduce . . . , Copyright 2012, 2 pages.

\* cited by examiner

END-TO END PROOF OF DISPLAY

TECHNICAL FIELD

The disclosure relates generally to display systems, and more particularly, to a method and system for end-to-end proof of display.

BACKGROUND

Display systems for providing digital signage and dynamic digital merchandising typically include a network of digital signs that can be controlled remotely using a central node. Such display systems may include, for example, a content creation component, a central content management component, and a number of players. The content creation component is used to import and/or create digital content (e.g., video, pictures, text, etc.) for display. The central content management component controls and schedules digital content for display on one or more players. The players, which may include, for example, LCD, plasma, and/or projection display screens, driven by a networked PC or STB (Set Top Box), display digital content as directed by the central content management component.

One issue with known display systems involves "proof of display" of the digital content on the display screen of a player. One known technique for providing proof of play (rather than proof of display) at the content management level involves maintaining a log of the sequencing and scheduling of the digital content. Unfortunately, such a log does not provide an actual guarantee of the delivery and display of the digital content at the player level.

Several techniques have been used at the player level to provide proof of play. For instance, a player may acknowledge the correct receipt and interpretation of a playlist and corresponding digital content, and may provide a report regarding the attempted display of the digital content. This technique, however, does not provide an actual guarantee of the display of the digital content at the display screen level.

Another player level technique involves sampling the display screen of the player using a "print screen" command and generating one or more thumbnail images. Although the thumbnails may confirm that digital content has successfully reached the graphic chipset of a player, the thumbnails do not provide a trustable proof of display, since no conclusive evidence exists that the thumbnails actually correspond to frames of digital content displayed on the display screen of the player.

Digital watermarks, which are sampled at the graphic chipset level of a player, have been added to digital content to provide proof of display. However, if the display screen of the player is broken, the presence of the watermark in the digital content will still be detected and verified at the graphic chipset level, thereby providing a false positive indication that the digital content has been displayed on the display screen of the player.

Video monitoring of a display screen of a player has been employed to provide proof of display. This is not a satisfactory solution in terms of reliability and cost effectiveness. Further, there is no evidence provided that the monitored video actually corresponds to scheduled video content.

SUMMARY

Aspects of the invention are directed to a method and system for end-to-end proof of display.

The present invention provides trustable evidence that specific digital content has been effectively displayed and viewed at a given time, duration, and location, at both the player and display screen level of a display system.

A first aspect of the invention provides a method for end-to-end proof of display of digital content, comprising: generating a unique identifier (UID) for a triplet including an item of digital content, an identity of a playlist that includes the item of digital content, and an identity of a player on which the item of digital content is to be rendered; generating a visual identifier based on the UID and a timecode; rendering the item of digital content on a display screen; overlaying the visual identifier on the rendered item of digital content on the display screen; capturing the visual identifier on the display screen; and extracting the UID and timecode from the captured visual identifier.

A second aspect of the invention provides an apparatus for end-to-end proof of display of digital content, comprising: a system for generating a unique identifier (UID) for a triplet including an item of digital content, an identity of a playlist that includes the item of digital content, and an identity of a player on which the item of digital content is to be rendered; a system for generating a visual identifier based on the UID and a timecode; a system for rendering the item of digital content on a display screen; a system for overlaying the visual identifier on the rendered item of digital content on the display screen; a reader for capturing the visual identifier on the display screen; and a system for extracting the UID and timecode from the captured visual identifier.

A third aspect of the invention provides a computer program comprising program code embodied in at least one computer-readable storage medium, which when executed, enables a computer system to implement a method for end-to-end proof of display of digital content, the method comprising: generating a unique identifier (UID) for a triplet including an item of digital content, an identity of a playlist that includes the item of digital content, and an identity of a player on which the item of digital content is to be rendered; generating a visual identifier based on the UID and a timecode; rendering the item of digital content on a display screen; overlaying the visual identifier on the rendered item of digital content on the display screen; capturing the visual identifier on the display screen; and extracting the UID and timecode from the captured visual identifier.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

The drawings are intended to depict only typical aspects of the invention, and therefore should not be considered as limiting the scope of the invention. In the drawings, like numbering represents like elements between the drawings.

DETAILED DESCRIPTION

As indicated above, aspects of the invention are directed to a method and system for end-to-end proof of display. As used herein, unless otherwise noted, the term "set" means one or more (i.e., at least one) and the phrase "any solution" means any now known or later developed solution.

Figure 1:
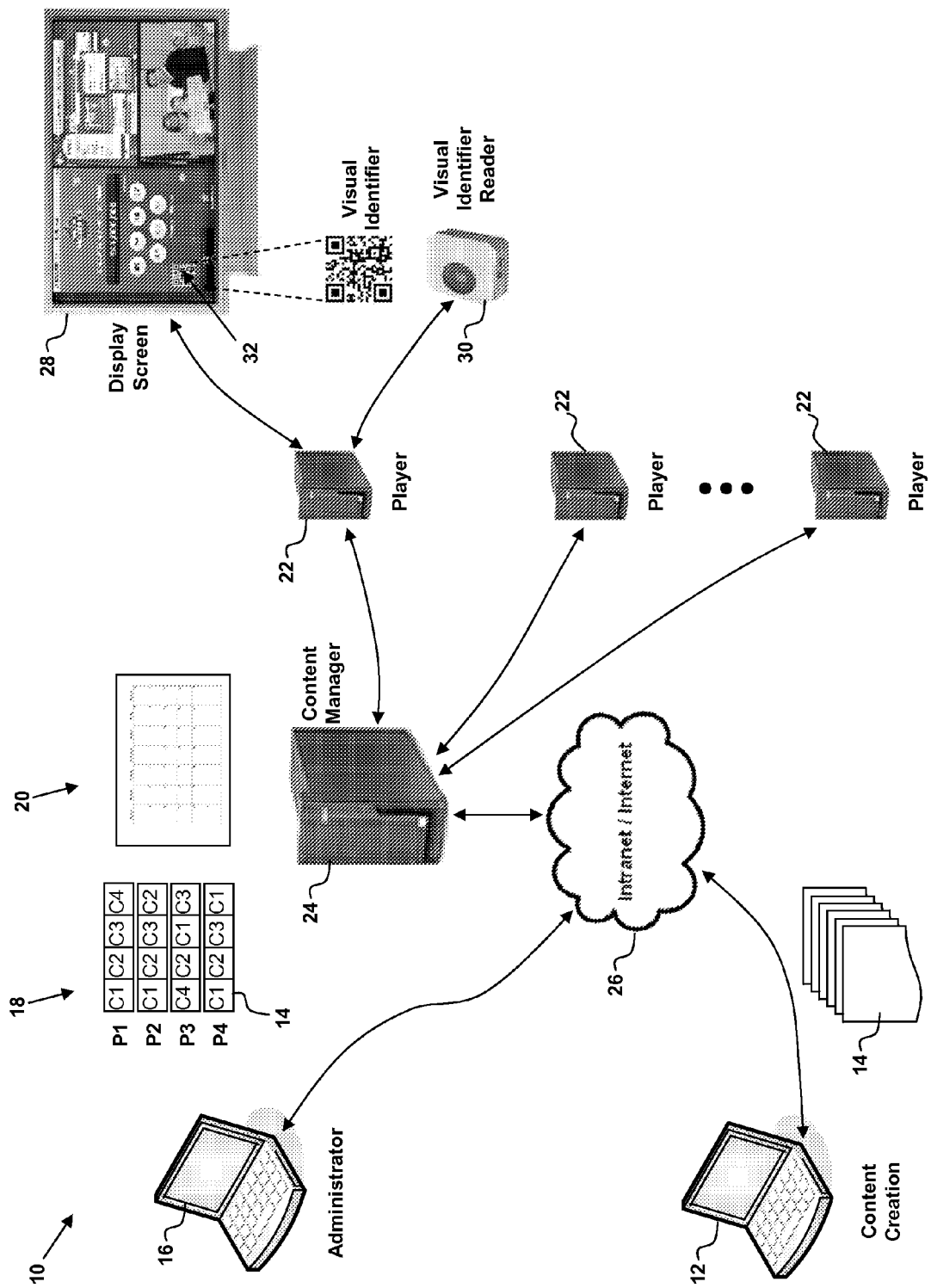
FIG. 1 depicts a system for end-to-end proof of display in accordance with an embodiment of the present invention.

FIG. 1 depicts an illustrative system 10 for end-to-end proof of display in accordance with an embodiment of the present invention. The system 10 includes a content creation component 12 for importing and/or creating digital content 14 for display. The digital content 14 may comprise any type and combination thereof of now known or later developed digital data, including, for example, videos, pictures, text, audio, markup language files, animation, and/or the like. The content creation component 12 may comprise, for example, a computing system running software for importing, creating, editing, etc., digital content. Any computing system (e.g., desktop computer, laptop computer, server, application server, etc.) and associated software capable of providing digital data for display can be used to provide the digital content 14.

In an embodiment, an administrator component 16 organizes the digital content 14 into a set of playlists 18. As depicted in FIG. 1, four playlists 18 (e.g., P1, P2, P3, and P4) are shown, where for example, playlist 18 (P1) includes digital content 14 denoted as C1, C2, C3, and C4. Although shown as including only four playlists 18, each including four files of digital content 14, it should be apparent that any number and configuration of playlists 18 can be used.

The administrator component 16 may also provide schedules 20 for the display of playlists 18 of digital content 14 on a set of players 22. In general, the administrator component 16 controls which digital content 14 (e.g., via playlists 18) is played where (e.g., on which players 22), and when (e.g., via schedules 20). The administrator component 16 may also be configured to monitor, secure, and/or remotely configure each of the components/resources of the system 10.

In an embodiment, a content manager component 24 manages digital content 14, playlists 18, schedules 20, and destinations (e.g., players 22) via a network 26 (e.g., LAN, WAN, Intranet, Internet, cloud, and/or the like). Digital content 14 and other data used in the practice of the present invention can be transferred among the components of the system 10 (e.g., between the content creation component 12 and the content manager component 24, between the content manager component 24 and the players 22, etc.) via the network 26 or using any other data transfer mechanism (e.g., cd, dvd, tape, thumb drive, email, etc.). The content manager component 24 sends the digital content 14 and playlists 18 to the players 22 based on the schedules 20 for playlist execution and content rendering.

Each player 22 includes or is associated with at least one display screen 28. Further, each player 22 includes a visual identifier reader 30 (e.g., a code reader (e.g., a 2D barcode reader), an optical character recognition (OCR) device, an image recognition and/or decoding device, and/or the like) for each display screen 28. The visual identifier reader 30 is capable of detecting and sampling a unique visual identifier 32 comprising an optical machine-readable representation of data that overlays (or is incorporated in) the digital content 14 rendered and displayed on the display screen 28. An enlarged view of an illustrative unique visual identifier 32 (e.g., a 2D barcode) is depicted in FIG. 1 below the display screen 28. The operation of the visual identifier readers 30 for providing proof of display is described in greater detail below.

In accordance with an embodiment, the present invention is based on:

the generation of a unique ID for each triplet of digital content, playlist, and player ID;

the display of a visual identifier, generated using the unique ID and a timecode, which overlays the digital content rendered on the display screen;

the capture of the displayed visual identifier using a visual identifier reader; and the extraction of the unique ID and timecode from the captured visual identifier.

Figure 2:
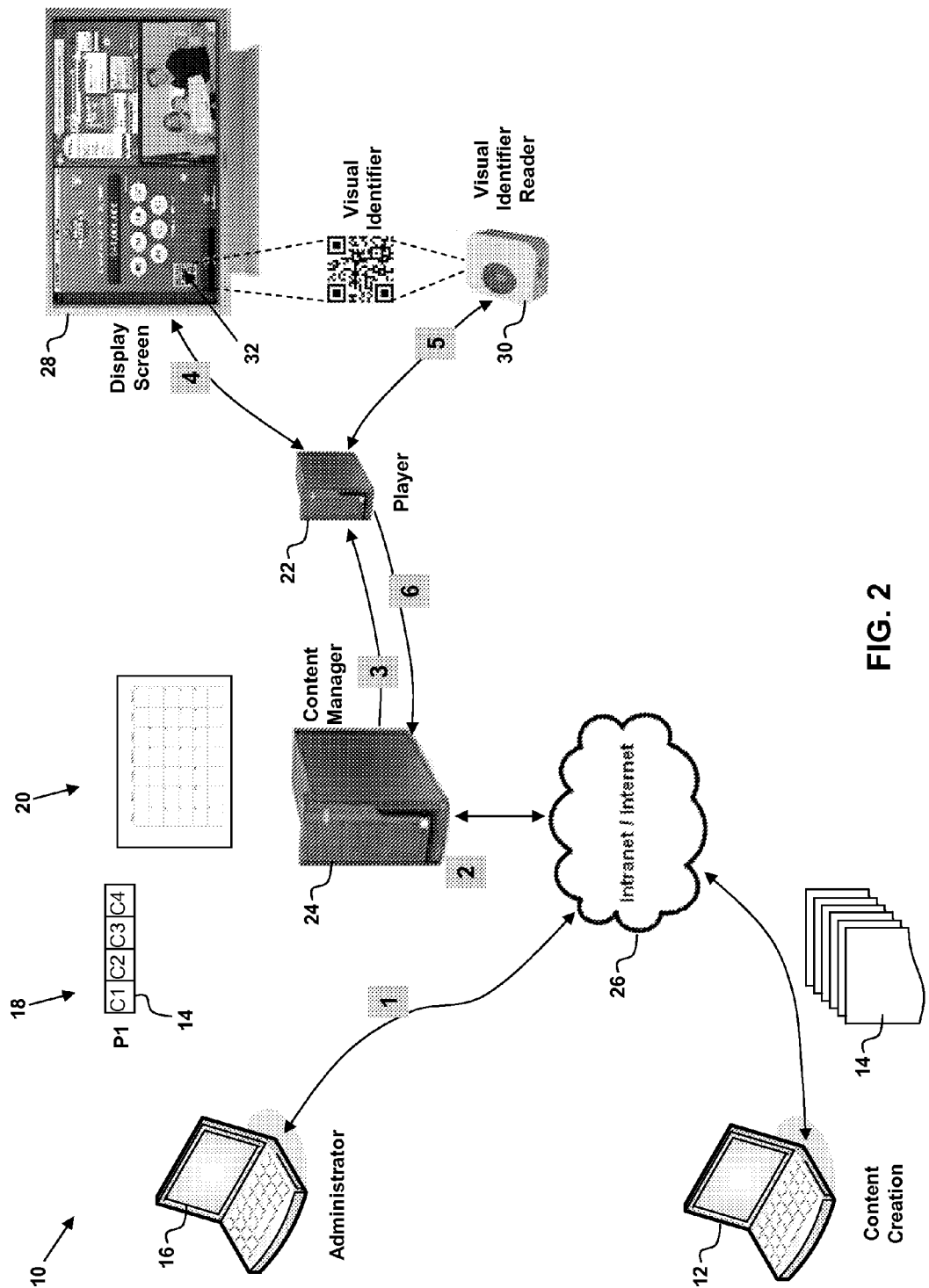
FIG. 2 depicts a system for end-to-end proof of display in accordance with an embodiment of the present invention.

A general flow in accordance with an embodiment of the present invention is depicted in FIG. 2. It should be noted that although only one playlist 18 and one player 22 are shown in FIG. 2, the system 10 will generally employ a plurality of playlists 18 and a plurality of players 22.

In process #1, the content manager component 24 manages digital content 14 and playlist 18 for display on the display screen 28 of the player 22. In this example, the playlist 18 denoted P1, containing digital content 14 denoted as C1, C2, C3, and C4, is provided to the player 22 for display, according to a schedule 20. The schedule 20 may, for example, direct the player 22 to display the digital content 14 of the playlist 18 at certain day(s)/time(s).

In process #2, the content manager component 24 generates a unique ID (UID) for each different triplet of digital content 14, playlist 18, and player 22 ID. In the above example, assuming that the ID of player 22 is Player1 and the playlist is P1, the UIDs may be generated based on the following:

1) C1/P1/Player1;
2) C2/P1/Player1;
3) C3/P1/Player1; and
4) C4/P1/Player1.

The UIDs can have any suitable configuration that uniquely identifies each triplet. For instance, the UIDs can be generated using the file name of the digital content, a name of the playlist, and a device/network address of the player. Other methodologies for providing the UIDs are also possible, and the above example is not intended to be limiting.

In process #2, the content manager component 24 also encrypts the UID for each different triplet of digital content 14 to provide an encrypted UID (EUID). The EUIDs are used in a later process as part of the end-to-end proof of display provided by the present invention. Any suitable type of encryption (e.g., public/private key) can be used in the practice of the present invention.

In process #3, the content manager component 24 forwards the digital content 14 (including associated EUIDs) and playlist 18 to the player 22. The player 22 initially performs a check to determine the authenticity of the received data. This process may include, for example, for each item of digital content 14 listed in the received playlist 18: reading the item of digital content 14 listed in the playlist 18; computing a UID for the triplet of the digital content 14, playlist 18, and player 22 ID; decrypting the EUID received from the content manager component 24 and associated with the digital content 14 to generate a decrypted UID; and comparing the computed UID and the decrypted UID. If the computed UID and the encrypted UID match, the player 22 proceeds with the display of the digital content 14 according to the playlist 18 schedule. If not, an error is reported and the player 22 does not display the digital content 14. The comparison of the computed UID and the decrypted UID by the player 18 is used to ensure that the playlist 18 received by the player 22 actually contains the correct digital content 14 and that the correct player 22 has received the correct playlist 18.

In process #4, the player 22 executes the playlist 18 by displaying the digital content 14 in the playlist 18 according to the schedule 20. In addition, for each piece of digital content 14 in the playlist 18, the player 22 generates a unique visual identifier 32 and displays the visual identifier 32 along with the corresponding digital content 14 on the display screen 28.

In accordance with the present invention, the visual identifier 32 is generated by combining the UID for a given piece of digital content 14 with a timecode indicating when (e.g., day/time) the digital content 14 is displayed by the player 22 on the display screen 28. In an embodiment, the visual identifier 32 comprises a 2D barcode that overlays (or is incorporated in) the digital content 14 rendered and displayed on the display screen 28. Any other suitable visual identifier 32 can be used in the practice of the present invention, and any examples described herein are not intended to be limiting. At intervals (e.g., every X seconds, every Y minutes, etc.), the visual identifier 32 is updated by the player 22 to reflect timecode changes.

In process #5, using the visual identifier reader 30, the player 22 detects and samples the visual identifier 32 that overlays the digital content 14 displayed on the display screen 28. The player 22 then decodes the captured visual identifier 32 to extract the UID associated with the digital content 14 and the timecode. The player 22 then checks the coherence of the obtained UID and one or more of the timecodes to determine if the correct digital content 14 has been displayed at the correct day/time by the player 22 on the display screen 28 in accordance with the playlist 18.

In process #6, the player 22 sends the coherence information for a sequence of UID and timecode combinations to the content manager component 24 to provide end-to-end proof of display evidence.

Figure 3:
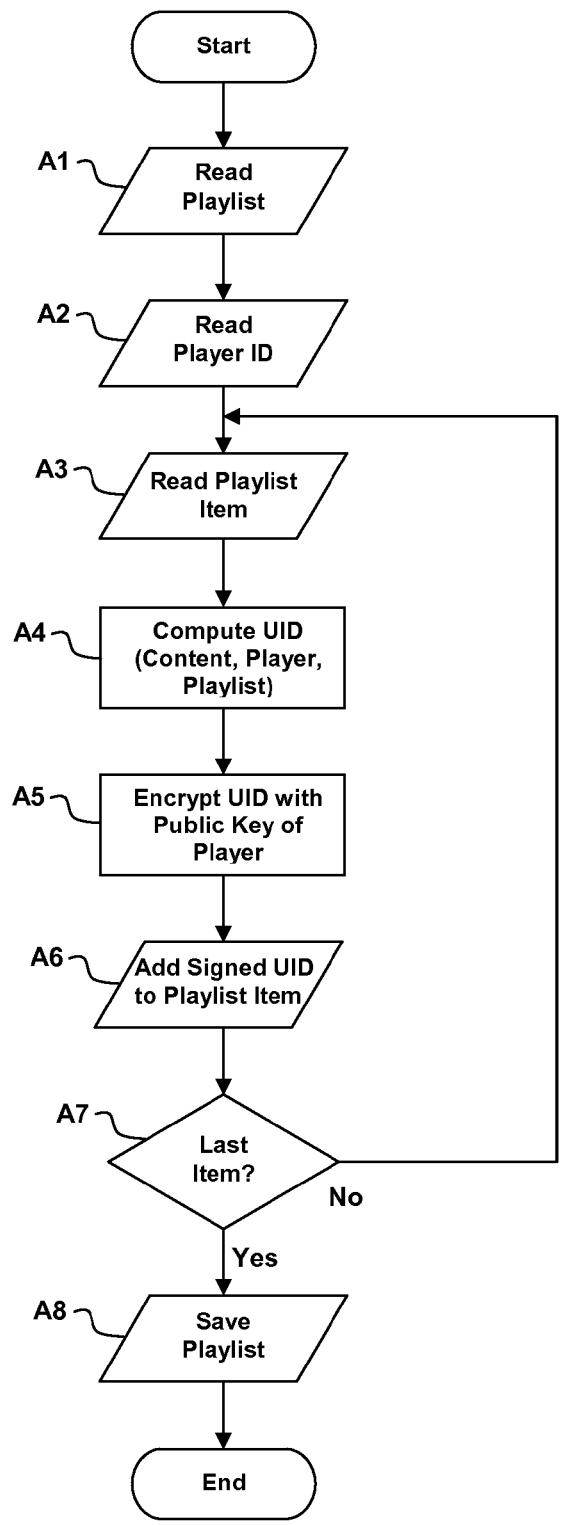
FIG. 3 depicts a process flow diagram in accordance with an embodiment of the present invention.

FIG. 3 depicts a process flow diagram of an illustrative process of encrypting the UID for each different triplet of digital content 14 to provide an encrypted UID (EUID) in accordance with an embodiment of the present invention. As detailed above, the encryption is provided by the content manager component 24.

At A1, the content manager component 24 reads the playlist 18. At A2, the content manager component 24 reads the player ID of the player 22 that is scheduled to display the playlist 18. At A3, the content manager component 24 reads the first item of digital content 14 in the playlist 18.

At A4, the content manager component 24 computes the UID for the triplet of the first item of digital content 14, player 22 ID, and playlist 18. At A5, the content manager component 24 encrypts the UID with a public key of the player 22. The encrypted UID is then added at A6 to the first item of digital content 14 in the playlist 18.

If there are additional items of digital content 14 in the playlist 18 (No, A7), flow passes back to A3, where the next item of digital content 14 in the playlist 18 is read and A4-A7 are repeated. If the item of digital content 14 in the playlist 18 is the last item of digital content 14 (Yes, A7), flow passes to A8 where the playlist 18 is saved. The process then ends.

Figure 4A:
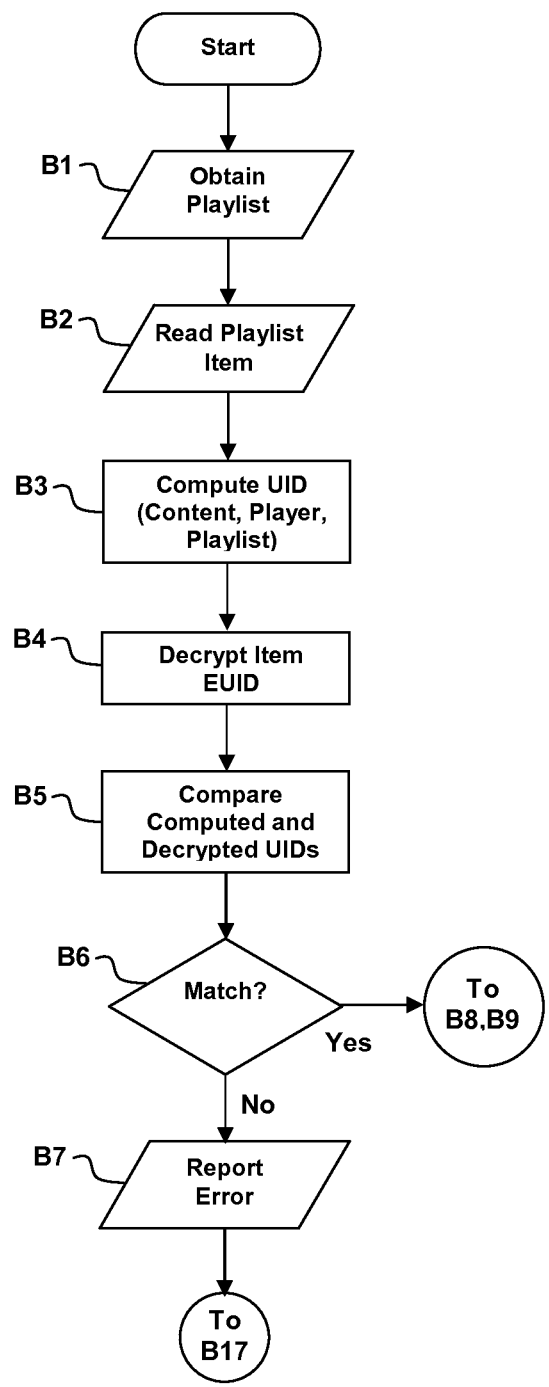
FIGS. 4A, 4B, and 4C depict a process flow diagram in accordance with an embodiment of the present invention.

FIG. 4 depicts a process flow diagram of an illustrative workflow of a player 22 in accordance with an embodiment of the present invention.

Figure 4B:
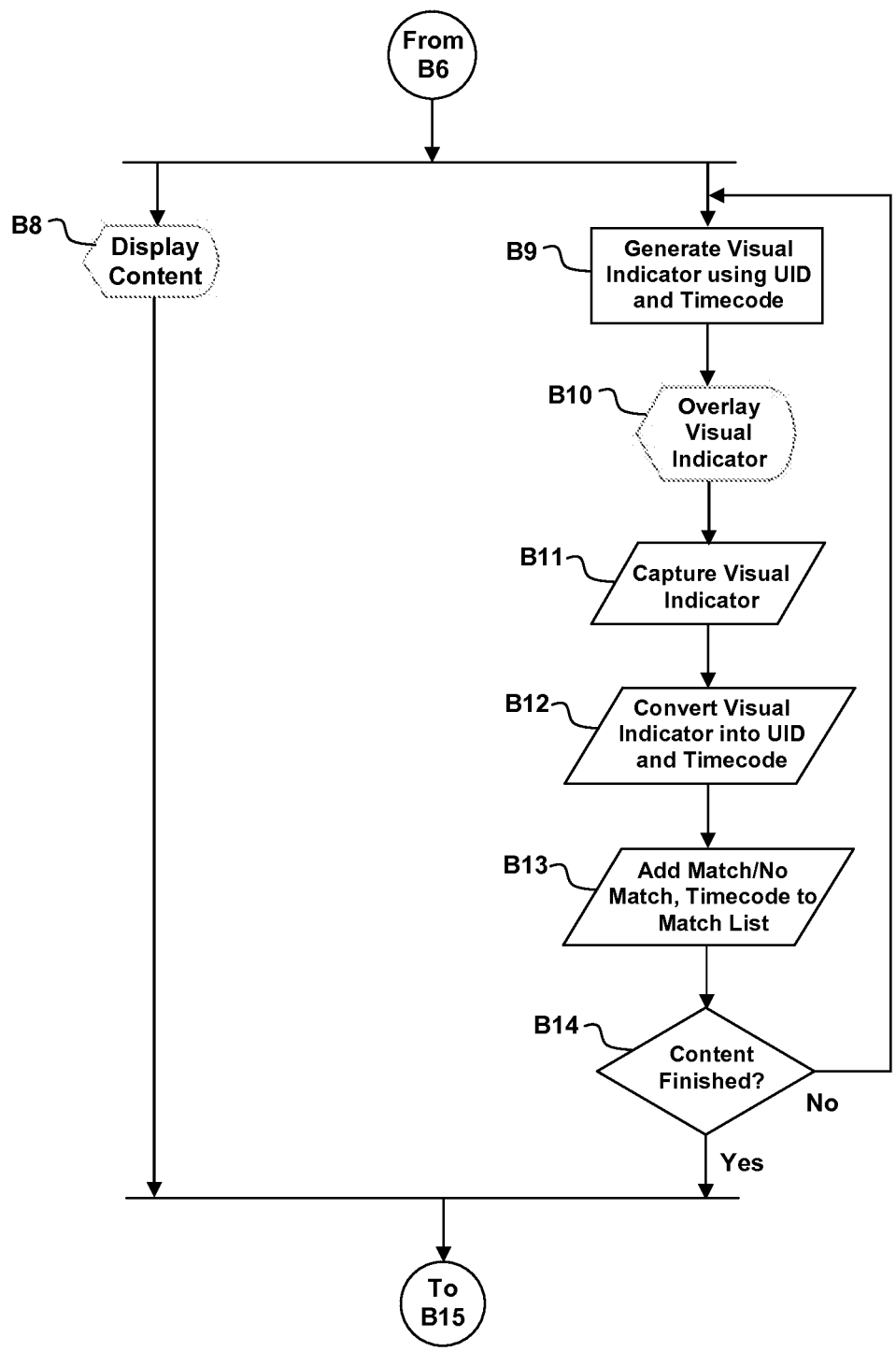
Figure 4C:
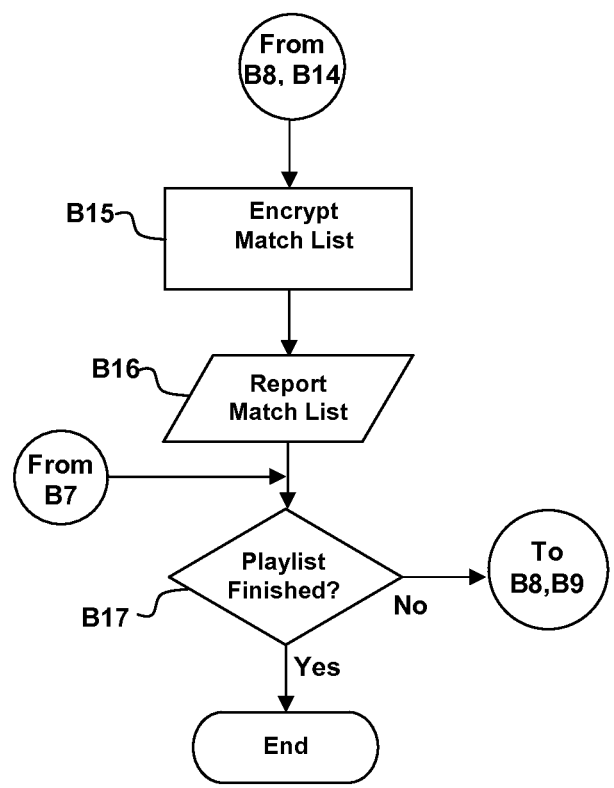

At B1, the player 22 obtains a playlist 18 from the content manager component 24. At B2, the player 22 reads the first item of digital content 14 in the playlist 18. At B3, the player 22 computes a UID for the triplet of the digital content 14, playlist 18, and player 22 ID. At B4, the player 22 decrypts the EUID associated with the first item of digital content 14 to generate a decrypted UID. At B5, the player 22 compares the computed UID and the decrypted UID. If the computed UID and the encrypted UID match (Yes, B6), flow passes to B8 and B9 (FIG. 4B). If the computed UID and the encrypted UID do not match (No, B6), an error is reported in B7 and flow passes to B17 (FIG. 4C).

Two processes are performed in parallel at B8 and B9. At B8, the player 22 displays the first item of digital content 14 in the playlist 18 on the display screen 28. Flow then passes from B8 to B15 (FIG. 4C). At B9, in parallel with B8, the player 22 generates a visual identifier 32 by combining the UID of the first item of digital content 14 with a timecode representing the current day/time at which the digital content 14 is displayed by the player 22 on the display screen 28. At B10, the player 22 overlays the visual indicator 32 on the digital content 14 rendered and displayed at B8 on the display screen 28.

At B11, the visual identifier reader 30 detects and samples the visual identifier 32 that overlays the digital content 14 displayed on the display screen 28. The player 22 then decodes at B12 the captured visual identifier 32 to extract the UID associated with the digital content 14 and the timecode.

At B13, the UID extracted at B12 is compared with the UID previously computed at B3 or decrypted at B4 (the UID computed at B3 and decrypted at B4 should match as determined at B6). The result (e.g., Match/No Match) of the comparison at B12, as well as the timecode extracted at B12, are added to a match list at B13.

If the first item of digital content 14 in the playlist 18 has finished being displayed (Yes, B14), flow passes to B15 (FIG. 4C). If the first item of digital content 14 in the playlist 18 has not finished being displayed (No, B14), flow passes back to B9, where the player 22 generates an updated visual identifier 32 by combining the UID of the first item of digital content 14 with an updated timecode representing the current day/time. The updated visual identifier 32 is then displayed by the player 22 on the display screen 28.

At B15, the player 22 encrypts the match list (e.g., using public/private key encryption). At B16, the player 22 reports the match list, which contains a sequence of UID and timecode combinations, to the content manager component 24. To this extent, the present invention provides trustable evidence that specific digital content 14 has been effectively displayed and viewed at a given time, duration, and location, at both the player 22 level (e.g., via comparison of computed and decrypted UIDs (B5)) and display screen 28 level (via match/no match of UID and timecode of visual indicators 32 (B13)).

At B17, the player 22 determines whether all of the items of digital content 14 in the playlist 18 have been processed and displayed. If not (No, B17), flow passes back to B8 and B9. If so (Yes, B17), the process ends.

Figure 5:
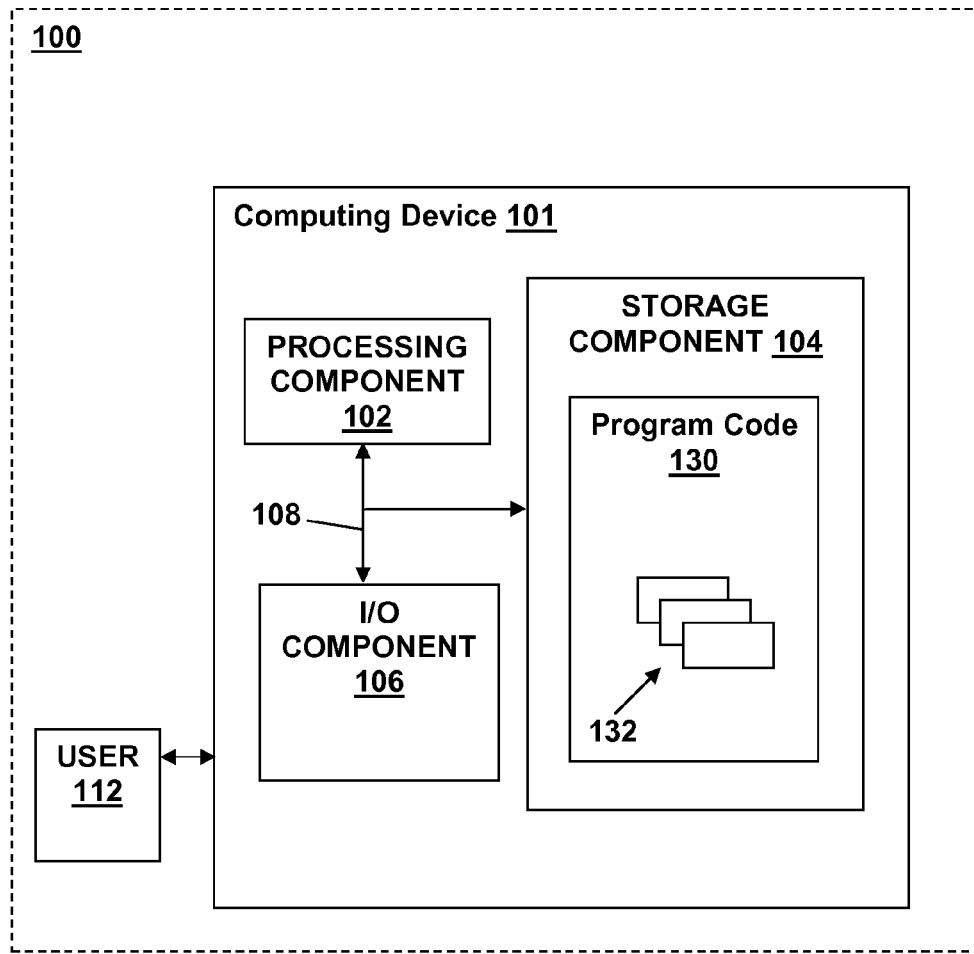
FIG. 5 depicts an illustrative environment for providing end-to-end proof of display in accordance with an embodiment of the present invention.

FIG. 5 shows an illustrative environment 100 for providing end-to-end proof of display in accordance with an embodiment of the present invention. To this extent, the environment 100 includes at least one computing device 101 that can implement, perform and/or control various processes/systems (e.g., content creation component 12, administration component 16, content manager component 24, player 22, visual identifier reader 30, display screen 28, etc.) described herein.

The computing device 101 is shown including a processing component 102 (e.g., one or more processors), a storage component 104 (e.g., a storage hierarchy), an input/output (I/O) component 106 (e.g., one or more I/O interfaces and/or devices (e.g., keyboard, mouse, display screen, player, etc.), and a communications pathway 108. In general, the processing component 102 executes program code 130, which is at least partially fixed in the storage component 104, for implementing at least one of the processes/systems described herein. While executing program code 130, the processing component 102 can process data (e.g., digital content, playlists, schedules, match lists, etc.), which can result in reading and/or writing transformed data from/to the storage component 104 and/or I/O component 106 for further processing. The pathway 108 provides a communications link between each of the components in the computing device 101. The I/O component 106 can comprise one or more human I/O devices, which enable a user 112 to interact with the computing device 101 using any type of communications link. To this extent, the program code 130 can be configured to manage a set of interfaces (e.g., graphical user interface(s), application program interface(s), and/or the like) that enable user 112 interaction, and to manage (e.g., store, retrieve, create, manipulate, organize, present, etc.) data using any solution.

In any event, the computing device 101 can comprise one or more general purpose computing articles of manufacture (e.g., computing devices) capable of executing program code 130 installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, program code 130 can embodied as any combination of system software and/or application software.

Further, the program code 130 can be implemented using a set of modules 132. In this case, a module 132 can enable the computing device 101 to perform a set of tasks, and can be separately developed and/or implemented apart from other portions of program code. As used herein, the term "component" means any configuration of hardware, with or without software, which implements the functionality described in conjunction therewith using any solution, while the term "module" means program code that enables the computing device 101 to implement the actions described in conjunction therewith using any solution. When fixed in a storage component 104 of the computing device 101 that includes a processing component 102, a module 132 can be a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of the computing device 101.

It is understood that the computing device 101 is merely representative of various possible equivalent computer systems that may perform a process described herein. To this extent, in other embodiments, the functionality provided by the computing device 101 can be at least partially implemented by one or more computing devices that include any combination of general and/or specific purpose hardware with or without program code 130. In each embodiment, the hardware and program code 130, if included, can be created using standard engineering and programming techniques, respectively.

While performing a process described herein, the computing device 101 can communicate with one or more other computer systems using any type of communications link. The communications link can comprise any combination of various types of wired and/or wireless links; comprise any combination of one or more types of networks; and/or utilize any combination of various types of transmission techniques and protocols.

While shown and described herein as a method and system for end-to-end proof of display, it is understood that aspects of the invention further provide various alternative embodiments. For example, in one embodiment, the invention provides a computer program fixed in at least one computer-readable medium, which when executed, enables a computing device to provide end-to-end proof of display. To this extent, the computer-readable medium includes program code which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code 130 for providing end-to-end proof of display, which implements some or all of a process described herein. In this case, a computer system can process a copy of program code 130 that implements some or all of a process described herein to generate and transmit, for reception at a second, distinct location (e.g., a mobile device, a computer system, etc.), a set of data signals that has one or more of its characteristics set and/or changed in such a manner as to encode a copy of the program code 130 in the set of data signals. Similarly, an embodiment of the invention provides a method of acquiring a copy of program code 130 that implements some or all of a process described herein, which includes a computer system, a mobile device, etc., receiving the set of data signals described herein, and translating the set of data signals into a copy of the computer program fixed in at least one computer-readable medium. In either case, the set of data signals can be transmitted/received using any type of communications link.

It is understood that aspects of the invention can be implemented as part of a business method that performs a process described herein on a subscription, advertising, and/or fee basis. For example, the service provider can manage (e.g., create, maintain, support, etc.) a computer system and/or mobile device, that performs a process described herein for one or more customers. In return, the service provider can receive payment from the customer(s) under a subscription and/or fee agreement, receive payment from the sale of advertising to one or more third parties, and/or the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for end-to-end proof of display of digital content, comprising:
generating a unique identifier (UID) for a triplet including an item of digital content, an identity of a playlist that includes the item of digital content, and an identity of a player on which the item of digital content is to be rendered;
generating a visual identifier based on the UID and a timecode;
encrypting the UID to provide an encrypted UID (EUID) and adding the EUID to the item of digital content in the playlist;
authenticating the item of digital content in the playlist by:
decrypting the EUID to obtain a decrypted UID;
generating a computed UID for a triplet including the item of digital content read from the playlist, the identity of the playlist, and the identity of the player; and
comparing the decrypted UID and the computed UID;
rendering the item of digital content on a display screen;
overlaying the visual identifier on the rendered item of digital content on the display screen;
capturing the visual identifier on the display screen; and
extracting the UID and timecode from the captured visual identifier.

2. The method of claim 1, wherein
in the case that the decrypted UID and the computed UID match, rendering the item of digital content on the display screen; and
in the case that the decrypted UID and the computed UID do not match, reporting an error and not rendering the item of digital content on the display screen.

3. The method of claim 1, wherein the timecode represents a time when the item of digital content is rendered on the display screen.

4. The method of claim 3, further comprising:
determining, based on the UID and timecode extracted from the captured visual identifier, whether the item of digital content has been rendered at the correct time by the player on the display screen.

5. The method of claim 1, the determining further comprising:
obtaining a UID for the triplet including the item of digital content read from the playlist, the identity of the playlist, and the identity of the player; and
comparing the obtained UID with the extracted UID to provide a match result.

6. The method of claim 5, further comprising:
populating a match list with the match result and timecode.

7. The method of claim 1, further comprising:
generating an updated visual identifier based on the UID and an updated timecode as the item of digital content is rendered on the display screen;
capturing the updated visual identifier on the display screen; and
extracting the UID and updated timecode from the captured updated visual identifier.

8. An apparatus for end-to-end proof of display of digital content, comprising:
a system for generating a unique identifier (UID) for a triplet including an item of digital content, an identity of a playlist that includes the item of digital content, and an identity of a player on which the item of digital content is to be rendered;
a system for generating a visual identifier based on the UID and a timecode;
a system for encrypting the UID to provide an encrypted UID (EUID) and for adding the EUID to the item of digital content in the playlist;
a system for authenticating the item of digital content in the playlist by:
decrypting the EUID to obtain a decrypted UID;
generating a computed UID for a triplet including the item of digital content read from the playlist, the identity of the playlist, and the identity of the player; and
comparing the decrypted UID and the computed UID;
a system for rendering the item of digital content on a display screen;
a system for overlaying the visual identifier on the rendered item of digital content on the display screen;
a reader for capturing the visual identifier on the display screen; and
a system for extracting the UID and timecode from the captured visual identifier.

9. The apparatus of claim 8, wherein
in the case that the decrypted UID and the computed UID match, rendering the item of digital content on the display screen; and
in the case that the decrypted UID and the computed UID do not match, reporting an error and not rendering the item of digital content on the display screen.

10. The apparatus of claim 8, wherein the timecode represents a time when the item of digital content is rendered on the display screen.

11. The apparatus of claim 10, further comprising:
a system for determining, based on the UID and timecode extracted from the captured visual identifier, whether the item of digital content has been rendered at the correct time by the player on the display screen.

12. The apparatus of claim 8, the system for determining is further configured for:
obtaining a UID for the triplet including the item of digital content read from the playlist, the identity of the playlist, and the identity of the player; and
comparing the obtained UID with the extracted UID to provide a match result.

13. The apparatus of claim 12, further comprising:
a system for populating a match list with the match result and timecode.

14. The apparatus of claim 8, further comprising:
a system for generating an updated visual identifier based on the UID and an updated timecode as the item of digital content is rendered on the display screen;
a system for capturing the updated visual identifier on the display screen; and
system for extracting the UID and updated timecode from the captured updated visual identifier.

15. A computer program comprising program code embodied in at least one non-transitory computer-readable storage medium, which when executed, enables a computer system to implement a method for end-to-end proof of display of digital content, the method comprising:
generating a unique identifier (UID) for a triplet including an item of digital content, an identity of a playlist that includes the item of digital content, and an identity of a player on which the item of digital content is to be rendered;
generating a visual identifier based on the UID and a timecode;

encrypting the UID to provide an encrypted UID (EUID) and adding the EUID to the item of digital content in the playlist;

authenticating the item of digital content in the playlist by:
　decrypting the EUID to obtain a decrypted UID;
　generating a computed UID for a triplet including the item of digital content read from the playlist, the identity of the playlist, and the identity of the player; and
　comparing the decrypted UID and the computed UID;

rendering the item of digital content on a display screen;

overlaying the visual identifier on the rendered item of digital content on the display screen;

capturing the visual identifier on the display screen; and extracting the UID and timecode from the captured visual identifier.

16. The computer program of claim 15, wherein
in the case that the decrypted UID and the computed UID match, rendering the item of digital content on the display screen; and
in the case that the decrypted UID and the computed UID do not match, reporting an error and not rendering the item of digital content on the display screen.

17. The computer program of claim 15, wherein the timecode represents a time when the item of digital content is rendered on the display screen.

18. The computer program of claim 17, the method further comprising:
　determining, based on the UID and timecode extracted from the captured visual identifier, whether the item of digital content has been rendered at the correct time by the player on the display screen.

19. The computer program of claim 15, the determining further comprising:
　obtaining a UID for the triplet including the item of digital content read from the playlist, the identity of the playlist, and the identity of the player; and
　comparing the obtained UID with the extracted UID to provide a match result.

20. The computer program of claim 19, the method further comprising:
　populating a match list with the match result and timecode.

21. The computer program of claim 15, the method further comprising:
　generating an updated visual identifier based on the UID and an updated timecode as the item of digital content is rendered on the display screen;
　capturing the updated visual identifier on the display screen; and
　extracting the UID and updated timecode from the captured updated visual identifier.

* * * * *